(12) United States Patent
Hume

(10) Patent No.: US 7,279,196 B2
(45) Date of Patent: Oct. 9, 2007

(54) LINER FOR WASTE WATER SYSTEM REHABILITATION

(76) Inventor: James M. Hume, P.O. Box 24354, Jacksonville, FL (US) 32241

( * ) Notice: Subject to any disclaimer, the term of this patent is extended or adjusted under 35 U.S.C. 154(b) by 0 days.

(21) Appl. No.: 10/798,190

(22) Filed: Mar. 11, 2004

(65) Prior Publication Data

US 2004/0175559 A1    Sep. 9, 2004

Related U.S. Application Data

(63) Continuation of application No. 09/532,400, filed on Mar. 22, 2000, now Pat. No. 6,706,384.

(51) Int. Cl.
*B05D 7/22* (2006.01)

(52) U.S. Cl. .................. 427/230; 427/243; 427/373

(58) Field of Classification Search ........... 427/230, 427/236, 243, 373, 314; 428/310.5, 313.3, 428/318.6, 319.3
See application file for complete search history.

(56) References Cited

U.S. PATENT DOCUMENTS

| | | | |
|---|---|---|---|
| 3,844,527 A | 10/1974 | Scott | 249/189 |
| 3,948,412 A * | 4/1976 | Bennett | 220/4.04 |
| 3,986,781 A * | 10/1976 | Condo et al. | 404/31 |
| 4,217,383 A | 8/1980 | Patterson et al. | 428/95 |
| 4,361,336 A | 11/1982 | Reeh et al. | 277/207 |
| 4,426,817 A * | 1/1984 | Bomhard | 52/262 |
| 4,800,128 A | 1/1989 | Schacht et al. | 421/448 |
| 5,002,438 A | 3/1991 | Strong | 405/303 |
| 5,017,258 A | 5/1991 | Brown et al. | 156/294 |
| 5,032,197 A | 7/1991 | Trimble | 156/71 |
| 5,098,059 A | 3/1992 | Sawyer | 249/16 |
| 5,143,768 A | 9/1992 | Wilderman et al. | 428/68 |
| 5,268,392 A * | 12/1993 | Bertram | 521/51 |
| 5,283,299 A | 2/1994 | Tramontano et al. | 525/529 |
| 5,340,652 A | 8/1994 | Sondhe et al. | 428/413 |
| 5,389,692 A | 2/1995 | Bertram | |
| 5,608,998 A | 3/1997 | Hume | 52/245 |
| 5,618,616 A * | 4/1997 | Hume et al. | 428/319.3 |
| 5,763,734 A | 6/1998 | Nachtman et al. | 388/1 |
| 5,807,514 A * | 9/1998 | Grinshpun et al. | 264/46.6 |
| 5,856,371 A | 1/1999 | Grimm et al. | 521/159 |
| 5,879,501 A | 3/1999 | Livingston | 156/242 |
| 5,955,013 A | 9/1999 | Grinshpun et al. | 264/45.5 |

* cited by examiner

*Primary Examiner*—William Phillip Fletcher, III

(57) ABSTRACT

A technique and device for rehabilitating or repairing waste water system components or the like, comprising a spray-applied, multi-layer liner which seals the components and imparts structural integrity. The liner comprises a primer layer, a first moisture barrier layer, a foam layer and a second moisture barrier layer. The first and second moisture barrier layers are preferably made of the same material and form a skin on both sides of the internal foam layer. The combination of the foam layer and the two moisture barrier layers imparts structural strength and rigidity to the cured liner.

11 Claims, 3 Drawing Sheets

LINER FOR WASTE WATER SYSTEM REHABILITATION

CROSS-REFERENCE TO RELATED APPLICATIONS

The present application is a continuation of U.S. patent application Ser. No. 09/532,400 filed on Mar. 22, 2000 which issued as U.S. Pat. No. 6,706,384 on Mar. 16, 2004.

BACKGROUND OF THE INVENTION

1. Field of the Invention

The invention relates generally to the rehabilitation or repair of waste water system components, such as manholes, sewer pipes, lift stations or clarifiers, through the application of a multi-layer liner. More particularly, the invention relates to the rehabilitation of such systems where the multi-layer liner is spray-applied and comprises at least a surfacer layer and a barrier layer. Even more particularly, the invention comprises such a liner where the surfacer layer is composed of a urethane foam, the barrier layer is composed of a polyurea and isocyanate polymer blend. Alternatively, the surfacer layer may be an epoxy and the barrier layer a polyurea foam. In a second embodiment, the invention relates to a multi-layer liner composed of a first barrier layer, a surfacer layer and a second barrier layer.

2. Description of the Prior Art

Deterioration of waste water system components is a severe and growing problem. Originally built of brick, block or concrete construction, these components develop leaks, cracks and holes due to age, erosion, corrosion and ground water intrusion. Leakage from old manholes and sewer lines contaminates the environment and sometimes results in catastrophic damage with respect to clean-up and repair costs.

Many concrete structures, such as containment areas or ponds, require a liner to prevent leakage of the contained material into the concrete and adjacent soil and to prevent corrosion or deterioration of the concrete from the material, which is often corrosive and/or toxic. Due to the size of most of these structures, a preformed liner is both impractical and expensive. Therefore, a spray on liner which may be applied relatively quickly, easily and at a reduced cost would be beneficial.

Since the cost of repairing the components is typically much less than the cost of replacement, many techniques have been developed to repair and rehabilitate waste water system components. For example, it is known to recast manholes and the like through the use of forms and poured concrete, such as shown in U.S. Pat. No. 5,032,197 to Trimble. Because this process is very labor intensive, many techniques are directed toward spray-applied liners. For example, Strong in U.S. Pat. No. 5,002,438 teaches the use of sprayed cement to form a liner inside the deteriorating structure. Spray-applied epoxy, acrylic or polyurethane liners are also known, as is the use of resin impregnated substrates, such as felt, as taught in U.S. Pat. No. 5,017,258 to Brown et al. The current spray-applied systems suffer from moisture, delamination, shrinkage and structural weakness problems resulting from the typical environment encountered in the repair operation.

U.S. Pat. No. 5,618,616 to Hume describes a technique and device for rehabilitating waste water system components wherein a multilayered liner is used to impart structural strength and integrity to the components. The multi-layer liner of Hume is composed of a primer layer a first moisture barrier layer, a foam layer and a second moisture barrier layer. The primer layer is applied directly to the surface of the waste water system components and can be applied to a wet surface. Typically, the primer layer is an epoxy material.

It is an object of this invention to provide a technique and particular liner structure for repairing waste water system components which is spray-applied and does not suffer from the problems relating to moisture, delamination, shrinkage and structural weakness.

It is a further object to provide such an invention which increases the structural integrity of the repaired component due to the unique composition of the layers within the multi-layer laminate applied to the component.

It is still another object to provide such an invention which can be applied to any shape surface having any number of irregularities and that has a rapid cure time.

SUMMARY OF THE INVENTION

The invention is a technique and device for rehabilitating or repairing waste water system components and the like or for lining and/or other concrete structures such as concrete containment areas, comprising a spray-applied, multi-layer liner which seals the components and imparts structural integrity. The liner comprises a surfacer layer and barrier layer. The surfacer layer is applied to a dry, pretreated surface, typically a concrete or cement surface. The barrier layer is applied to the surfacer layer. The combination of the surfacer layer and the barrier layer may impart structural strength and rigidity to the cured liner, depending on the specific combination of liner materials used. Both the surfacer layer and the barrier layer are typically a rapid curing material. Preferably, the surfacer layer is a urethane foam and the barrier layer is a polyurea and isocyanate blend. The surfacer layer may also be an epoxy and the barrier layer a polyurea foam.

In an alternative embodiment, the invention is a technique and device for rehabilitating or repairing waste water system components and the like, comprising a spray applied, multilayer liner where the liner comprises a first barrier layer, a surfacer layer and a second barrier layer. The first barrier layer is applied to a dry, pretreated surface. The surfacer layer is applied over the first barrier layer. The second barrier layer is subsequently applied over the surfacer layer. The combination of the first barrier layer, surfacer layer and second barrier layer imparts structural strength and rigidity on the cured liner. The layers of the liner are all rapid curing materials. Preferably, the surfacer layer is a urethane foam and the barrier layers are a polyurea and isocyanate blend.

In still another embodiment, the present invention is a liner comprising a foam liner material. The foam liner material is applied to a substrate surface, where it forms a hardened inner shell, a structural and insulative layer and an outer bonding layer.

In both embodiments, the substrate may be cleaned and dried prior to application of the first layer. Where an epoxy is used to form the surfacer layer, the substrate need not be dry prior to application.

DETAILED DESCRIPTION OF THE INVENTION

The liners of the present invention are spray-applied using conventional compressed air techniques to rehabilitate and repair deteriorated waste water systems or to otherwise line concrete structures. The liner components have rapid cure rates and the cured liner typically imparts structural strength and integrity to the lined components.

Waste water system components, such as manholes, sewer pipes, lift or pump stations and clarifiers, degrade and deteriorate over time—resulting in loss of integrity and leakage of liquid components into the environment. Likewise, many other similar concrete or metal structures deteriorate and need to be repaired in a rapid, effective manner. Many concrete structures, such as concrete containment areas may need lining to prevent seepage, leakage or deterioration from the often toxic or corrosive material contained therein.

Figure 1:
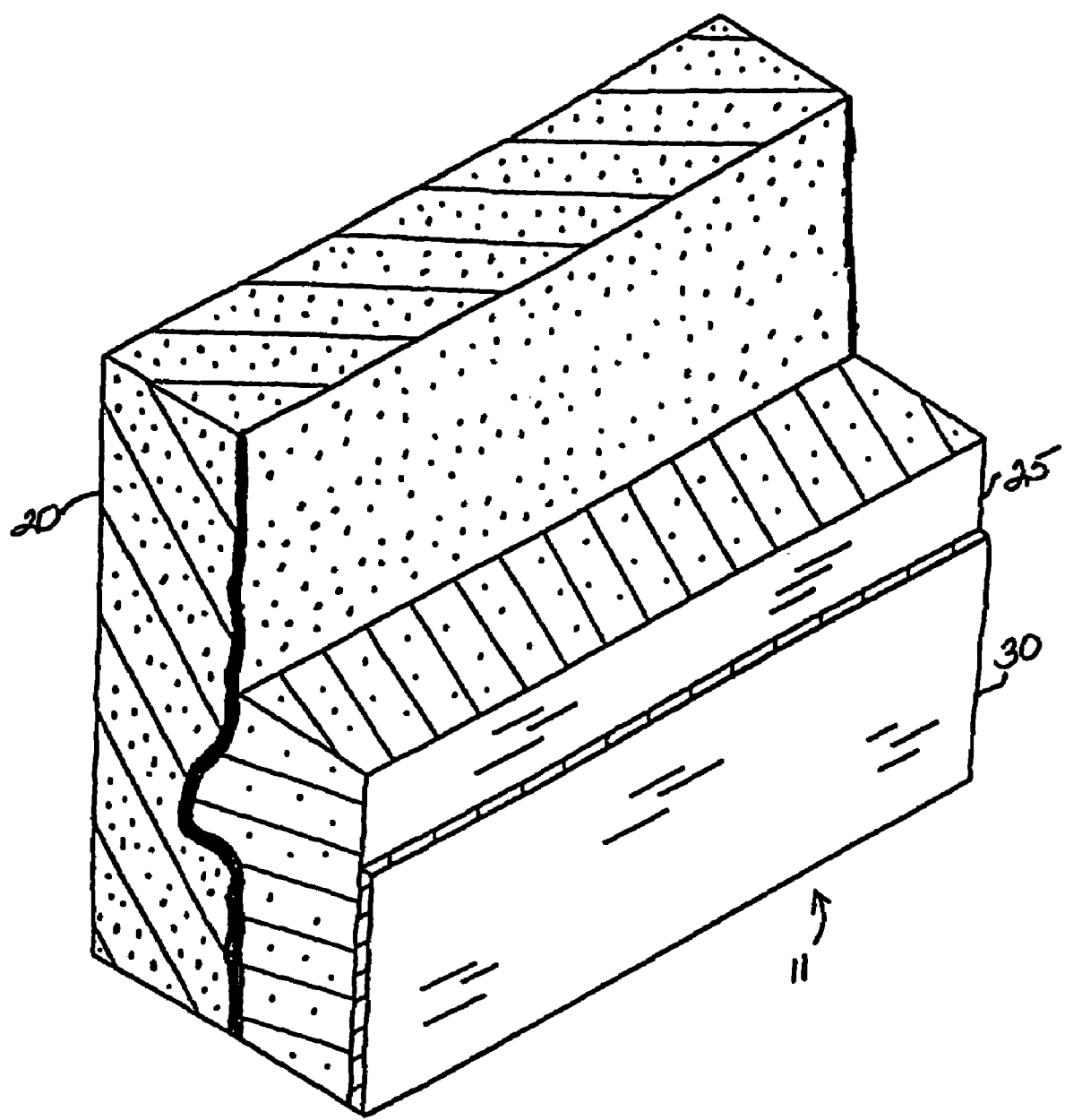
FIG. 1 is a cross sectional perspective view of a portion of the bi-layer liner as applied to a concrete substrate.
Figure 2:
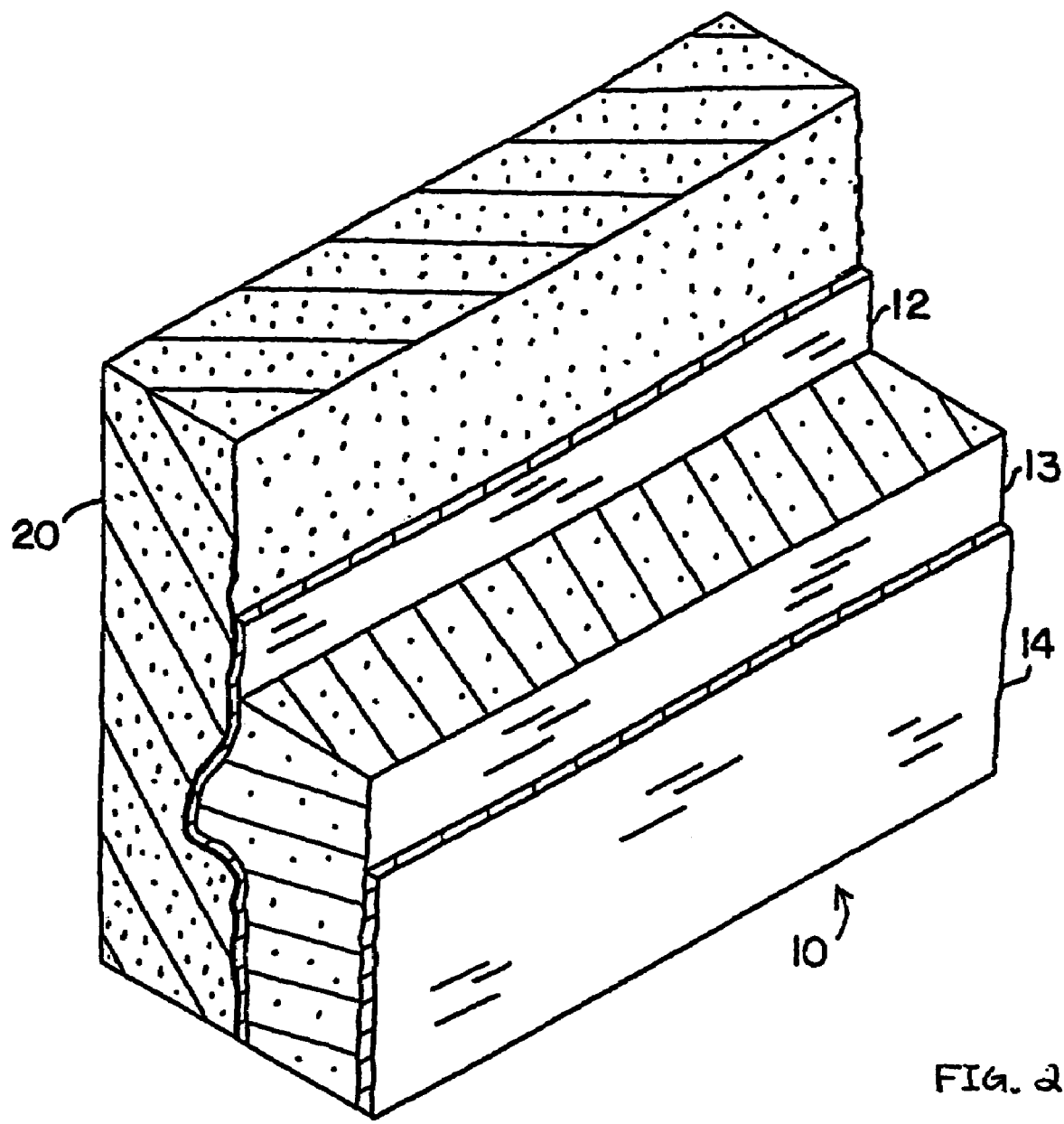
FIG. 2 is a cross sectional perspective view of a portion of the multi-layer liner as applied to a concrete substrate.

As illustrated by the sectional depiction in FIG. 1, the invention comprises a bi-layer liner 11 applied to a concrete, brick, block, metal or similar substrate 20. Typically, the substrate 20 will be a deteriorated manhole or sewer pipe having an irregular surface with cracks or holes, but may be any substrate that needs protection, such as a concrete containment structure. The liner 11 comprises in a first embodiment a surfacer layer 25 and a barrier layer 30. In a second embodiment and as shown in FIG. 2, the liner 10 may also comprise a first barrier layer 12, a surfacer layer 13 and a second barrier layer 14. The liner 10 is applied so as to cover the entire internal surface of the substrate 20, which is usually generally tubular in configuration, although any shape or configuration is possible and the technique is applicable without regard to the particular shape of the substrate.

In a first embodiment of the invention, the substrate surface 20 is initially prepared using high pressure water or abrasive sand blasting to remove all hard contaminants, any micro-organisms or living matter such as mold, mildew, etc., and any loose degraded materials of the substrate itself. The substrate surface 20 is then dried using heat. This drying process eliminates the need to use a primer to treat the substrate surface, as in the prior art. The surfacer layer 25 is applied directly to the substrate 20. The heat to dry the substrate surface can be supplied by any means known in the art. The abrading and drying steps result in a clean surface with an optimized surface for adhesion of the liner. Where an epoxy is used as the surfacer layer, the substrate surface need not be dried prior to application of the surfacer layer. Next the surfacer layer 25 is spray-applied using conventional compressed air spraying devices. In one embodiment, the surfacer layer 25 is preferably composed of a polyurethane blend which rapidly foams and cures upon exiting the spray nozzle of the application equipment. Preferably, the foam material is primarily closed cell and has a rise time of less than 30 seconds and preferably less than 10 seconds. The surfacer layer 25 is applied preferably to result in a dry thickness of at least 500 mils, although the surfacer layer can be thicker overall or in selected areas if necessary. In another embodiment, an epoxy material may be used to form the surfacer layer. Depending on the thickness of the surfacer layer 25 and the specific substrate material being covered, the surfacer layer as applied may create a smoother inner surface, its bulk filling any holes, depressions or cracks in the substrate surface 20.

Finally, the barrier layer 30 is spray-applied over the entire surface of surfacer layer 25. The barrier layer 30 may be a polymer blend of separate components which are mixed as they exit the spray nozzle, the components reacting to form a hard material upon curing. Preferably, a blend of polyurea component and an isocyanate component is utilized, with the two components formulated to have similar viscosities. In an alternate embodiment, the barrier layer 30 may be a polyurea foam. Preferably, the barrier layer 30 is applied to a dry film thickness of preferably between 40 to 80 mils, and even more preferably at a thickness of 60 mils. It should be understood, however, that the specific characteristics of the barrier layer are dictated by the specific application. The material used for the baffler layer should have a gel time of less than a few seconds and preferably less than three seconds, with total cure time of less than 60 seconds and preferably less than 30 seconds, and have minimal shrinkage during curing. This rapid cure is necessary to insure integrity of barrier layer even when applied under non-optimum conditions. The preferred polyurea and isocyanate blend has a tensile strength of greater than 1500 psi, an elongation percentage of 125%, tear strength of 350 psi, a shore D hardness of 55 and a 100% modulus of greater than 1500. The barrier layer is impermeable to water and other fluids and is a structurally rigid layer adhered to the substrate so as to remain adhered under pull test conditions of greater than 300 psi.

In a second embodiment of the invention, as shown in FIG. 2, the liner 10 is composed of a first barrier layer 12, a surfacer layer 13 and a second barrier layer 14. The barrier layers have the same properties as described for the barrier layer of the first embodiment. Likewise, the surfacer layer 13 of the second embodiment is identical to the surfacer layer 25 of the first embodiment.

The substrate surface 20 is prepared as previously described and the first barrier layer 12 is spray-applied thereto. The surfacer layer 13 is then applied so as to completely cover the first barrier layer 12. The second barrier layer 14 is then applied to cover the surfacer layer 13.

The resulting liner 10 from either embodiment is a water impermeable barrier strongly adhered to the substrate which prevents liquids from leaking out of the waste water system or concrete structure and also prevents ground water from entering the system. More importantly in terms of longevity, the liner 10 is a structural member which strengthens the components of the water system no matter to what extent they have deteriorated or to what extent they are exposed to corrosive substances or materials. Previously used water impermeably liners, whether composed of epoxy, acrylic, polyurethane or resin impregnated substrates, are not strongly adhered to the substrate and tend to delaminate over time. These typical liners do not reinforce or impart any structural strength to the system components. The liners of the present invention not only create a liquid barrier, they add to the strength of the waste water system components by providing a reinforcing member which structurally rigid due to its layered composition.

The liner of the second embodiment is a stressed skin panel, comprised of a structurally rigid foam internal layer bounded by two adhered surface layers—first moisture barrier layer and second moisture barrier layer—which are under stress due to the rapid cure rate of the material when applied. This rapid cure time does not allow internal stresses created by the small amount of shrinkage during curing to be relaxed, as occurs in sprayed films with long cure times. The principles of stressed skin panels, well known in the construction industry for walls of large buildings, provide for a structural member with increased structural strength and integrity of multiple factors beyond that of the individual components taken separately. Thus, the combination of the stressed skin panel created by the multi-layer combination of first moisture barrier layer, foam internal layer and second moisture barrier layer adhered to the waste water system component results in a repaired component with exceptional structural characteristics due to the reinforcing properties of the liner, and is a vastly improved system over those in use today.

Figure 3:
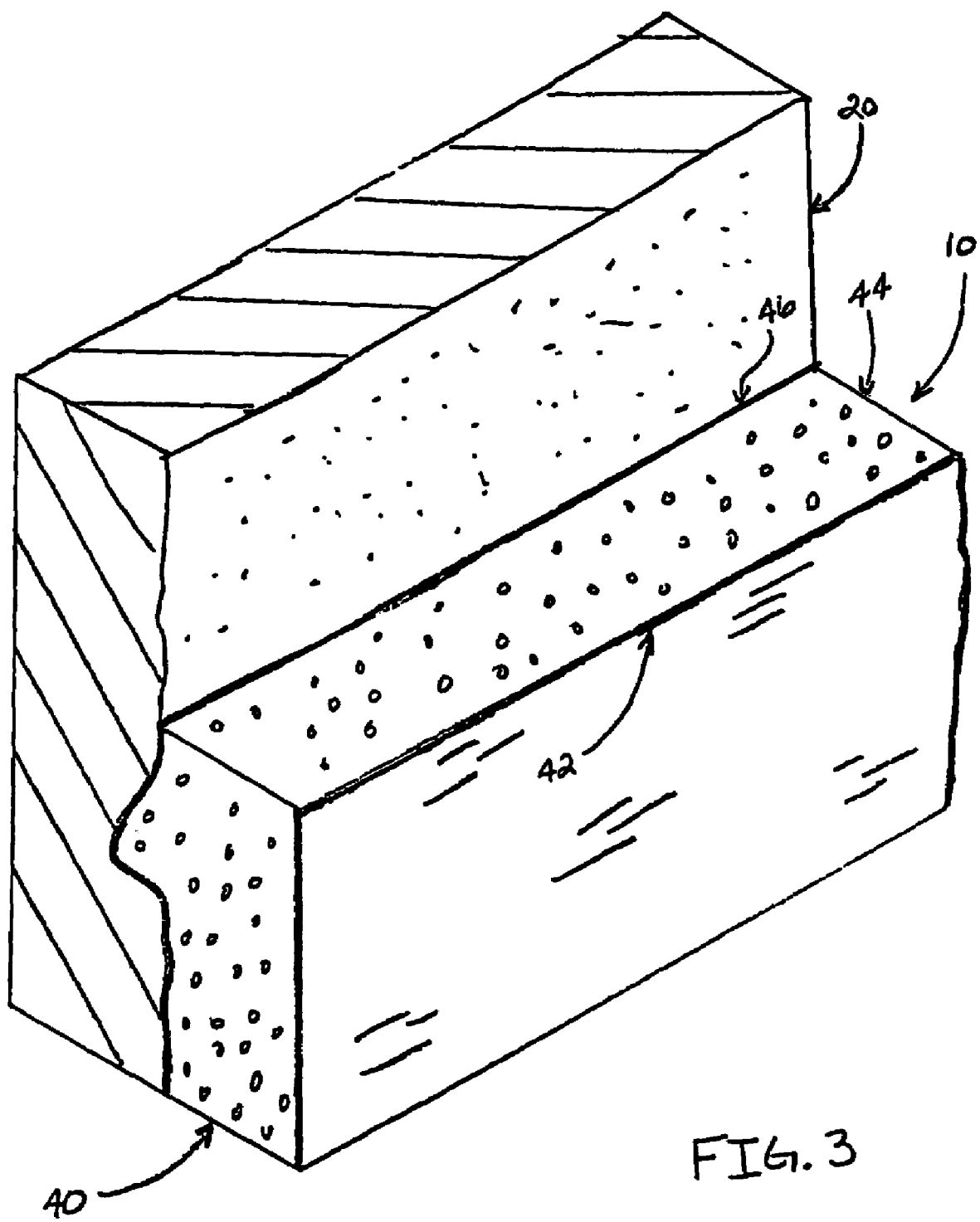
FIG. 3 is a cross sectional perspective view of a portion of the foam liner as applied to a concrete substrate.

As shown in FIG. 3, the liner 10 of the present invention may include a single foam layer 40 applied directly to the concrete surface 20. Preferably, the concrete surface 20 is first prepared, such as by pressure washing followed by drying. The surface is typically dried using heat. The foam layer 40 is then applied using any suitable method known in the industry. The foam is preferably a polyurea foam or a polyurethane foam. As the foam dries and cures, it forms an inner, hardened shell 42, an intermediate, structural and insulative core 44 and an outer bonding layer 46. The inner shell 42 is typically impervious to water and any other corrosive or toxic chemicals which may be contained in or flow through the lined system. The inner shell 42 may also provide some rigidity and structural integrity to the liner. The intermediate core 44 is typically cellular in structure and imparts strength and stability to the liner, as well as providing an insulative effect due to the air trapped in the cellular structure of the core. The outer or bonding layer 46 interacts directly with the substrate surface, typically forming a mechanical bond thereto and holding the liner securely against the substrate. The outer layer 46 may also prevent seepage of undesirable material into the system.

It is understood that obvious equivalents and substitutions may become known to those skilled in the art. The true scope and definition of the invention therefore is to be as set forth in the following claims.

I claim:

1. A method for lining concrete structures comprising:
   a. preparing a surface of a concrete structure for receipt of a foam material;
   b. applying a foam material directly to said surface of said concrete structure; and
   c. curing said foam material, the curing of which results in the formation of a protective liner over said concrete structure, said protective liner having three distinct layers.

2. The method of claim 1, wherein the step of curing results in a protective liner comprised of an inner hard shell, an outer bonding layer and an insulative core between said hard shell and bonding layer.

3. The method of claim 1, wherein one of said layers provides rigidity and structural integrity to the liner.

4. The method of claim 1, wherein one of said layers is cellular in structure.

5. The method of claim 1, wherein one of said layers traps air within its structure to provide an insulating effect by said liner.

6. The method of claim 1, wherein one of said layers is a bonding layer that bonds the other layer to the surface of the concrete structure.

7. The method of claim 6, wherein said bonding layer seals the surface of the concrete structure.

8. The method of claim 1, wherein
   a. one of said layers provides rigidity and structural integrity to the liner;
   b. another of said layers is cellular in structure and traps air within a portion of said cells to provide an insulating effect by said layer; and
   c. another of said layers is a bonding layer that bonds the other layers to the surface of the concrete structure.

9. The method of claim 1, wherein
   a. one of said layers is a closed-cell foam; and
   b. another of said layers is a hard watertight skin.

10. The method of claim 1, wherein said protective layer comprises:
    a. a first layer formed of a closed-cell foam; and
    b. a second layer formed of a hard, watertight shell.

11. The method of claim 10, wherein said first layer is disposed adjacent said surface between said surface and said hard, watertight shell.

* * * * *